Feb. 26, 1963  J. W. BROWN, JR  3,078,919
RECUPERATOR
Filed Feb. 8, 1960  5 Sheets-Sheet 1

INVENTOR.
JOHN W. BROWN, JR.
BY
Bosworth, Sessions
Herrstrom & Knowles
ATTORNEYS Feb. 26, 1963  J. W. BROWN, JR  3,078,919
RECUPERATOR
Filed Feb. 8, 1960  5 Sheets-Sheet 2
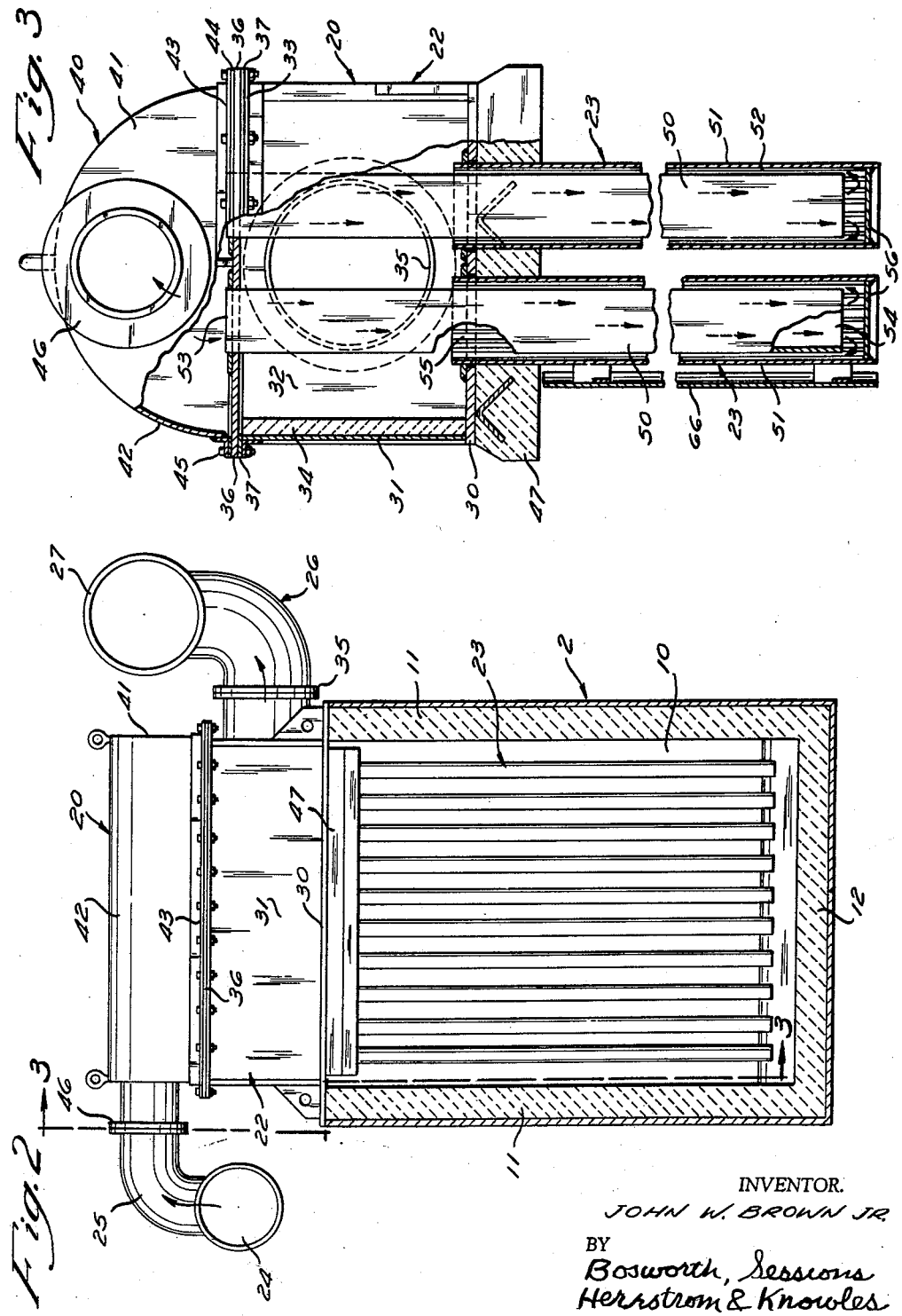
INVENTOR.
JOHN W. BROWN JR.
BY
Bosworth, Sessions
Herrstrom & Knowles
ATTORNEYS

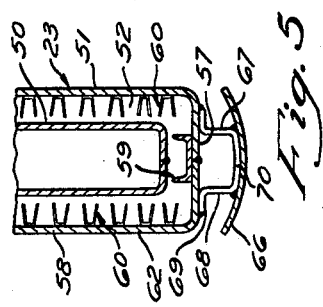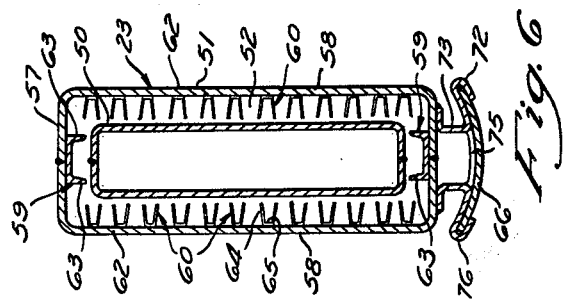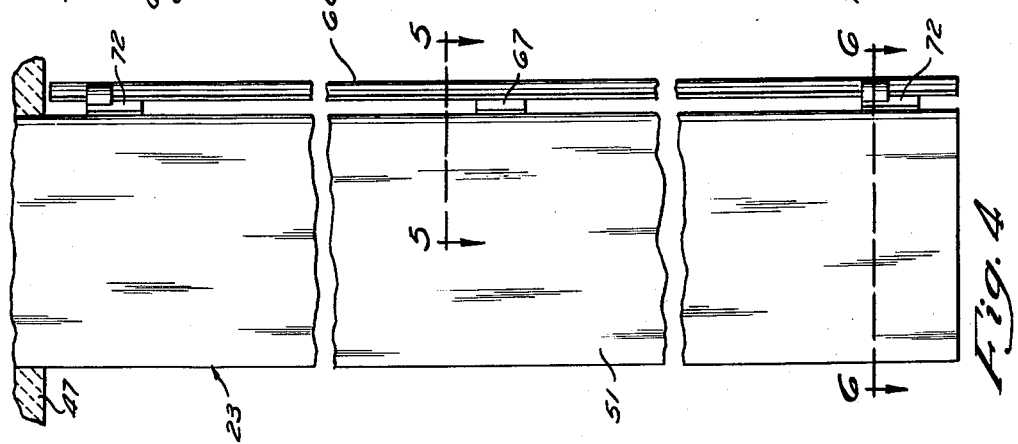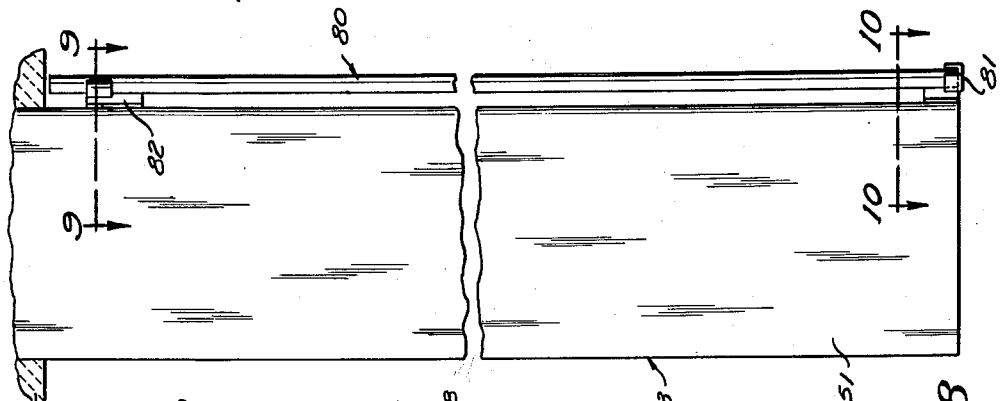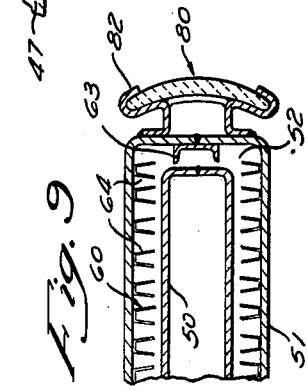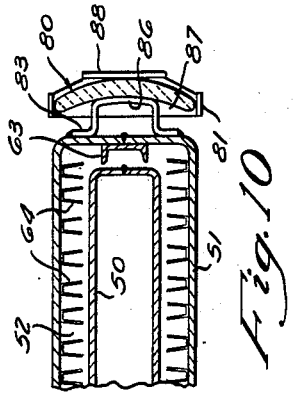
INVENTOR.
JOHN W. BROWN, JR.

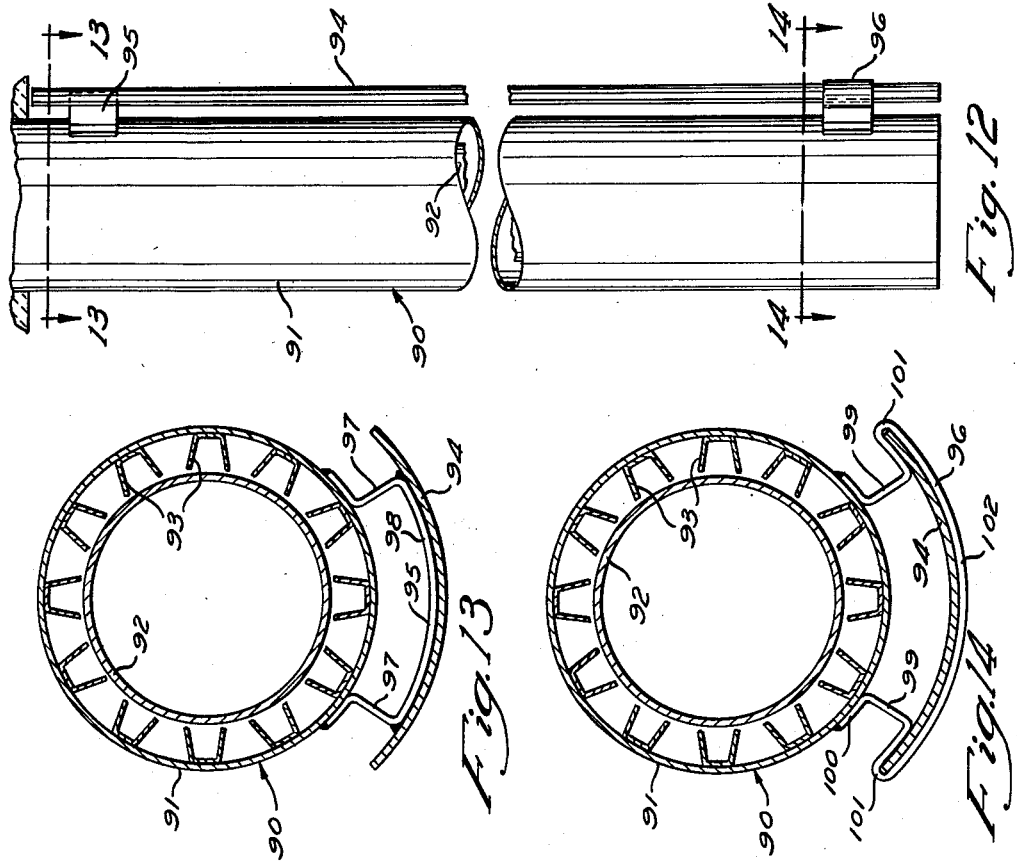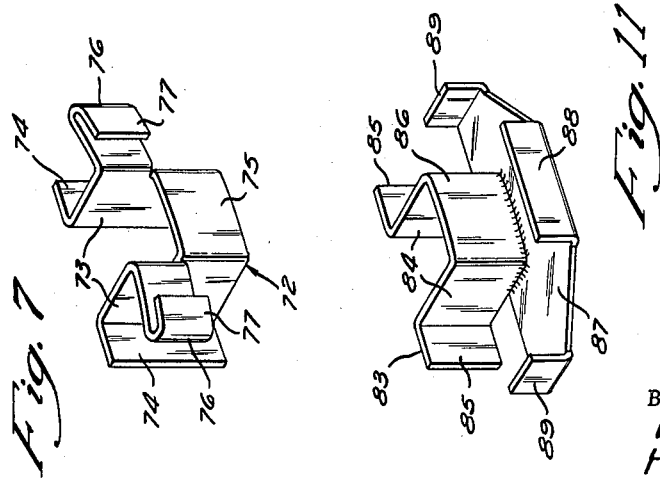

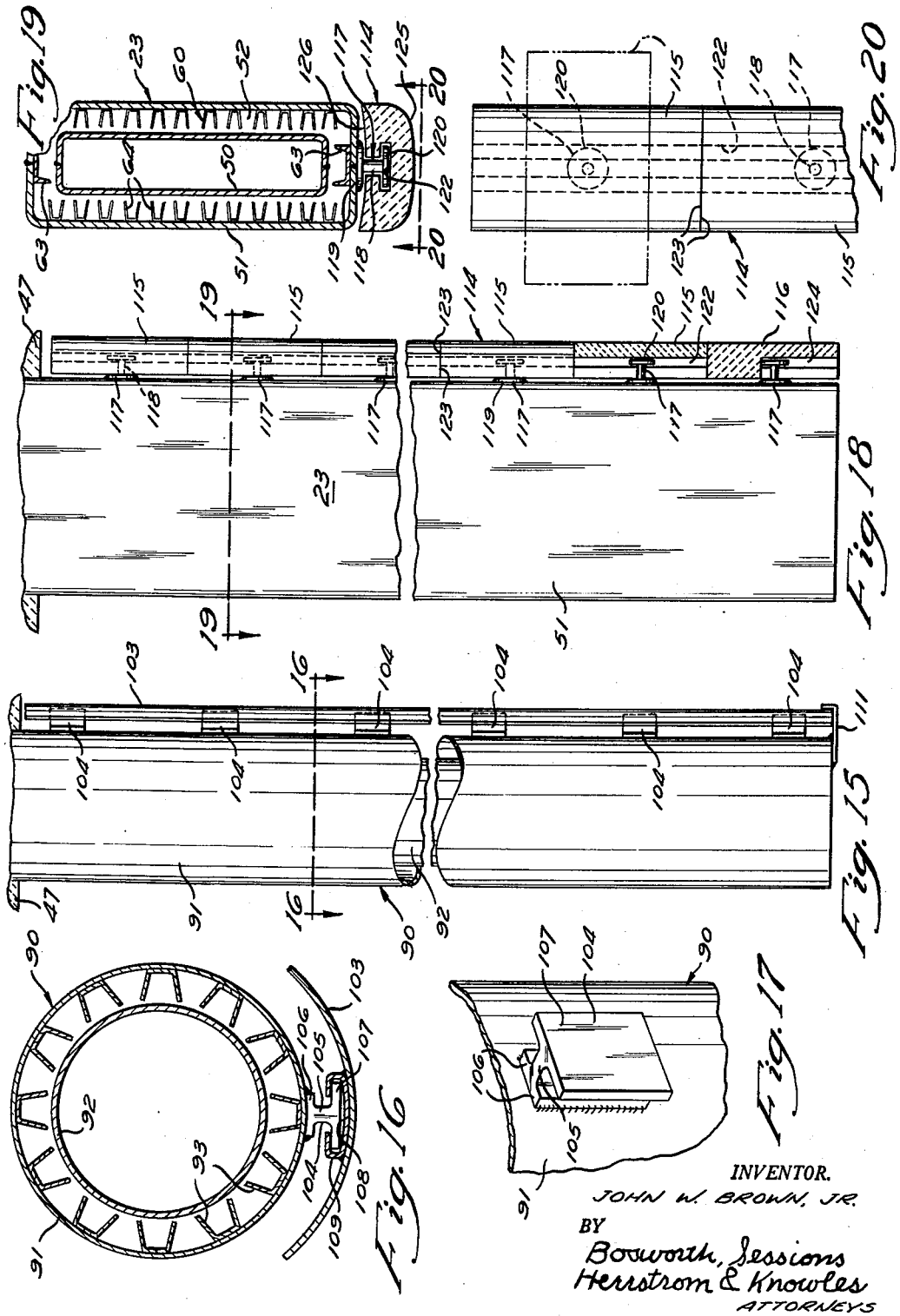

United States Patent Office 3,078,919
Patented Feb. 26, 1963

3,078,919
RECUPERATOR
John W. Brown, Jr., Lakewood, Ohio, assignor to Brown Fintube Company, Elyria, Ohio, a corporation of Ohio
Filed Feb. 8, 1960, Ser. No. 7,442
2 Claims. (Cl. 165—81)

This invention relates to heat exchangers, and more particularly to recuperators in which hot gases such as hot products of combustion or flue gases are used to preheat air or fluid fuel to be used in combustion.

For the purpose of convenience, the invention will be discussed in connection with recuperators associated with heating furnaces used in the steel industry, in which flue gas is used to preheat combustion air for the furnace burners, although it will be apparent that the invention may have other uses and provide advantages in other fields.

In steel industry heating furnaces, it is necessary to burn substantial amounts of fuel with large volumes of air in order to achieve the high temperatures and large quantities of heat required for steel heating operations; this results in large volumes of waste or flue gases, having high temperatures and heat contents remaining after the primary heating use. These factors have long made it advantageous to use recuperators or regenerators to recover some of the heat of the waste gases by using the hot flue gases to preheat the combustion air and thus increase the heat output of the furnace for a given amount of fuel consumption.

In recent years the greatly increased costs of fuel, labor and capital equipment and the attendant necessity for close cost control in all steel making operations, have made it important to recover as much heat as possible from flue gases and transfer it to the incoming combustion air in order to increase the heating efficiency and thus the output of the furnace to the greatest extent possible. It is also important that furnace shut-downs for maintenance, such as for repair or replacement of recuperators, be reduced to a minimum. While new furnace installations are designed and built with these factors in mind, great efforts are also being made to increase the efficiencies and outputs of existing furnaces because of the high costs of new furnaces and long times required to build and put them into operation; and increased recovery of otherwise wasted heat in flue gases is one of the most effective and economical approaches toward achieving increases in efficiency and output of old furnaces.

For these reasons it is desired that recuperators employed not only provide high recovery of heat from flue gases, but also have long service lives with a minimum of maintenance and furnace shut-down. This, however, is exceedingly difficult to achieve because of the extremely rigorous service conditions to which the recuperator heat exchange elements are subjected in operation.

In recuperators of the general type in connection with which this invention provides particular advantages, i.e. metallic recuperators having bayonet type heat exchange elements the heat exchange elements are exposed to hot waste or flue gases which often are at such high temperatures that they are incandescent, and which usually have high velocities. The high temperatures alone have deteriorating effects on the metal of the outer walls of the heat exchange elements; and the relatively high velocities of the hot gases also tend to harmfully affect the metal by erosion tendencies. The flue gases also contain constituents which tend to corrode or cause other deleterious chemical or metallurgical reactions on such metal, and this action is promoted by the high gas temperatures and velocities. In the heat exchange element these harmful effects occur to the greatest extent on the portion of the outer wall of the heat exchange element facing the flow of hot flue gas.

Other problems may occur because of distortions or warping of the recuperator heat exchange elements, as often occurs in certain prior types of recuperators having bayonet type heat exchange elements in which the inner and outer tubes of circular cross section define between them an annular space which is clear except for a few widely spaced lugs intended to separate the tubes. The recuperator is designed so that in each heat exchange element the air to be heated flows downwardly through the inner or bayonet tube which has an open lower end, and upwardly through the annular space between the inner and outer tubes. The air is heated by transfer of heat to and through the outer tube from the stream of hot flue gases outside such tube.

In such a recuperator heat exchange element, one major type of such distortion occurs when the portion of the arcuate wall of the outer tube facing the stream of hot flue gases, which may be defined as the front portion of the tube wall, flattens under the influence of heat, apparently due to unequal expansion of the metal. When this occurs, there is a corresponding decrease in the width of the annular space between the inner and outer tubes in this area, thus restricting the amount of air which can flow in the hottest portion of the periphery of the heat exchange element. In another major type of distortion in this type of recuperator heat exchange element, the outer tube as a whole tends to curve or bow so that its free end is displaced in the direction of the flow of flue gases, apparently due to greater expansion of the portion of the wall of the tube facing the hot gases than of other portions of the tube; this distortion can also result in restriction of air flow in the hottest portion of the tube. Usually, both these major types of distortions occur together, and other types may occur. Such distortions and the resulting reduction of air flow tend to cause additional increases in heating of the portions of the outer tube wall facing the stream of hot gas, which heating causes additional distortion of the outer tube and further restriction of the air flow between the inner and outer tubes, and so on, frequently continuing until the tubes contact to cause "hot spots" and failure of the heat exchange element. Such distortions thus may cause failure of the heat exchange elements or require frequent preventative inspection or repair, and in any case result in costly shut-downs and loss of production.

Furthermore, the portion of the wall of the heat exchange element facing the stream of flue gases often tends in service to have deposited on it a layer formed of corrosion or other reaction products, or solids depositing out of the flue gas. Such a layer often tends to accentuate the difficulties indicated above and may reduce the heat exchange effectiveness of the portion of the surface covered by such layer.

The above described deleterious influences of the hot flue gases are greatest on the heat exchange elements which are first exposed to the hot flue gases in a recuperator, and are next in magnitude on the first heat exchange elements of each bank within the recuperator, although all heat exchange elements in the recuperator are subjected to such influences to a greater or lesser degree. These deteriorating factors are accentuated when, as in present practices, the flue gas and furnace operating temperatures used are as high as possible in order to obtain maximum furnace outputs.

A general object of this invention is to provide a recuperator having metallic heat exchange elements which are substantially free of the above indicated deficiencies. It is another object to provide such a recuperator in which the heat exchange elements may be used at higher temperatures than otherwise possible, with longer service life and a minimum of furnace shutdowns for repair or preventative inspection. It is a further object to provide a recuperator having metallic heat exchange elements of which the front portions of the outer tube walls facing the hot flue gases are provided with shielding members which greatly reduce or prevent overheating, excessive corrosion, or deterioration of such tube wall portions, deposition of undesirable materials thereon, and, if the heat exchange element is of the type which would otherwise tend to distort as described above, which greatly reduces or prevents such heating of the front wall portion of the recuperator element as tends to cause such harmful distortions. It is a further object of the invention to provide such a heat exchange element in a recuperator in which the shielding member is supported in spaced relation to the portion of the outer tube wall facing the flue gases, by means permitting the shielding member to move independently relatively to such tube wall portion as its dimensions change to a different extent than those of the heat exchange element due to temperature changes.

It is another object of this invention to provide recuperator units embodying these features which may be manufactured at low costs, be readily installed in connection with new or old furnames, and which may be easily removed for inspection, repair, or replacement.

Further objects and advantages of my invention will become apparent from the following description of preferred forms thereof, reference being made to the accompanying drawings in which:

FIGURE 2 is a vertical sectional elevation, taken along line 2—2 of FIGURE 1, and to the same scale;

FIGURE 3 is an end elevation to an enlarged scale, in general a view from line 3—3 of FIGURE 2, of a recuperator unit embodying my invention, parts being broken to show details of construction thereof;

FIGURE 4 is a side elevation of a recuperator heat exchange element embodying my invention, as employed in the recuperator unit of FIGURE 3, the element being shown to an enlarged scale;

FIGURE 5 is a cross sectional elevation of the heat exchange element of FIGURE 4, along line 5—5 of FIGURE 4 but to a larger scale;

FIGURE 6 is another cross sectional elevation of the heat exchange element of FIGURE 4 along line 6—6 of FIGURE 4 and to the scale of FIGURE 5;

FIGURE 7 is a perspective elevation to an enlarged scale, of the bracket shown in FIGURE 6 for slidably holding the shielding member;

FIGURE 8 is a side elevation of another recuperator heat exchange element embodying my invention, to the same scale as FIGURE 4;

FIGURE 9 is a cross sectional elevation of the element of FIGURE 8, along line 9—9 of FIGURE 8, but to a larger scale;

FIGURE 10 is a cross sectional elevation along line 10—10 of FIGURE 8 to the same scale as FIGURE 9;

FIGURE 11 is a perspective elevation, to an enlarged scale of the bracket shown in FIGURE 10;

FIGURE 12 is a side elevation of another recuperator element embodying my invention, to the same scale as FIGURE 4;

FIGURE 13 is a cross sectional elevation of the element of FIGURE 12 along line 13—13 of FIGURE 12, but to a larger scale;

FIGURE 14 is a cross sectional elevation along line 14—14 of FIGURE 12, to the same scale as FIGURE 13;

FIGURE 15 is a side elevation of another recuperator element embodying my invention, to the same scale as FIGURE 4;

FIGURE 16 is a cross section along line 16—16 of FIGURE 15 but to a larger scale;

FIGURE 17 is a perspective elevation, to an enlarged scale of one of the supporting members of the embodiment of FIGURE 15;

FIGURE 18 is a side elevation of another recuperator element embodying my invention, to the same scale as FIGURE 4;

FIGURE 19 is a cross section, to an enlarged scale, along line 19—19 of FIGURE 18; and FIGURE 20 is a detail elevation to the same scale as FIGURE 19, showing how the segments of the shielding member may be tilted for ready installation or removal.

Figure 1:
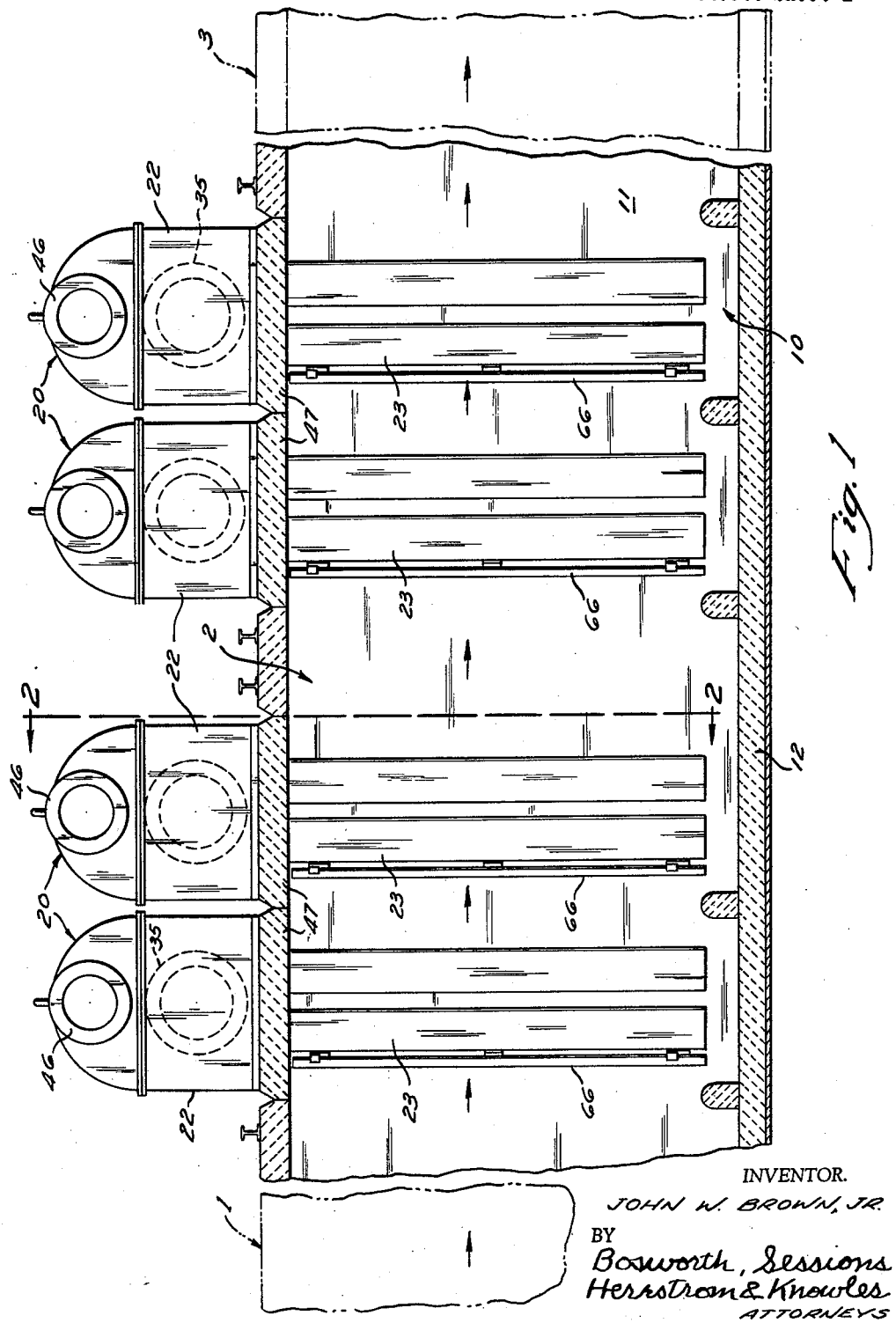
FIGURE 1 is a side elevation of a portion of one form of a recuperator embodying my invention, showing recuperator units in place in said recuperator, and in dotted lines a portion of the furnace from which the waste flue gases emanate and a portion of the stack to which such gases proceed.

FIGURES 1 and 2 show a recuperator embodying a preferred form of the invention in which flue gases emanating from a steel industry heating furnace indicated by numeral 1 pass through a recuperator generally designated by numeral 2 to a stack manifold 3. The recuperator includes a longitudinally extending chamber 10 comprising side walls 11 and bottom wall 12 formed of refractory material encased in steel to provide strength and prevent the escape of flue gases from the interior of the recuperator. As indicated, the flue gases flow longitudinally through the chamber, in the direction indicated by the arrows, from the furnace. The recuperator also comprises a plurality of recuperator units 20 supported at the tops of the side walls 11 of the recuperator chamber. Each of these units, which will be described in detail later, comprises an upper portion 22 having upper and lower compartments and carrying two parallel rows of downwardly extending elongated heat exchange elements 23.

Unheated air, impelled by a fan or blower, is supplied by a conduit 24 extending longitudinally of the recuperator and communicating by means of duct 25 with the upper compartment located in each of the upper portions 22 of the recuperator. In a manner to be described later, the unheated air from the upper compartment circulates downwardly and upwardly through each of the heat exchange elements 23 to the lower compartment located in the upper portion 22 of the recuperator unit 20, the air being heated in such passage. The heated air passes out of the upper portion 22 of each of the recuperator units 20 through a duct 26 to a conduit 27 extending longitudinally of the recuperator unit. The hot air then passes through the burners of the furnace where it is used in combustion and thus increases the heat output of the furnace.

As illustrated in FIGURES 2 and 3, the upper portion 22 of the recuperator unit comprises a lower partition or base plate 30 to which are fixed sheet metal side and end walls 31 and 32 terminating at their upper edges in a flange 33. The side and end walls are lined with suitable heat resistant material 34; one end wall has a flanged duct 35 constituting an air outlet and adapted to be connected to the duct 26 communicating with the heated air conduit 27, as shown in FIGURE 2.

In order to separate the upper portion 22 into the inlet and outlet chambers, an intermediate partition 36 is supported on the flange 33 at the top of the side and end walls through the sealing gasket 37. A housing, generally designated by reference numeral 40, is formed of end walls 41 fixed to a curved top 42 and has a bottom flange 43 which is supported by the partition 36 through sealing gasket 44. Bolts 45 serve to fasten flanges 33, 43, sealing gaskets 37 and 44, and the outer edges of partition 36 together to form a rigid air tight structure. A flanged duct 46 is located at the end of the housing 40 opposite the end at which duct 35 is located; duct 46 constitutes the cold air inlet and is adapted to be connected through duct 25 to the conduit 24, as shown in FIGURE 2.

Base plate 30 is preferably provided with a layer 47 of heat insulating material which protects the structure from the heat of the flue gases passing through the recuperator chamber 10.

As shown in FIGURE 3, and more clearly in FIGURES 5 and 6, each heat exchange element 23 comprises an inner tubular element 50, and surrounding and spaced from it, an outer tubular element 51, both being of rectangular cross section and mounted with the major axis of the cross section extending transversely of the upper portion 22 of the unit. These tubular members thus define between them a peripheral space 52. Inner tubular element 50 has openings 53 and 54 respectively at its upper and lower ends, as is apparent from FIGURE 3. Its upper end is fixed to partition 36 as by a welded joint, so that the element is suspended from the partition and communicates with the upper chamber. The outer tubular element 51 has an open upper end 55 and has its lower end closed by welded plate 56. Its upper end is fixed and suspended from the base plate 30, as by the welded joint shown, and thus communicates with the lower chamber of the upper portion 22 of the unit.

In operation of the recuperator unit, the air to be heated or cold air is blown into the upper chamber and passes downwardly through the inner tubular elements 50 and upwardly through the peripheral space 52 between the inner and outer tubular elements 50 and 51 into the lower chamber of upper portion 22, from which the heated air is discharged through duct 35.

In order to increase the heat exchange capacity, the outer tubular element 51 preferably has heat transfer fin members 59 and 60 respectively fixed to the inner surfaces of its end walls 57 and side walls 58, as shown in FIGURES 5 and 6. The outer tubular element 51 preferably is formed of two channel members 62 which are welded together at their longitudinal edges, the welded joint extending longitudinally at the center of each end wall 57 and having member 59 welded inside the joint as a backing strip. Since member 59 is of channel section, its projecting edges 63 form a plurality of heat transfer fins which extend in peripheral space 52 into close proximity to the outer surfaces of the end walls of the inner tubular element 50.

Each of the fin members 60 is in the form of a channel section comprising a pair of fin portions 64 joined to a base portion 65. The fin members are welded to the interior surface of each channel 62 before its assembly into tubular element 51, preferably in accordance with the method and apparatus disclosed in my Patent No. 2,473,668, issued June 21, 1949. The fin portions 64 are so proportioned that they extend in peripheral space 52 into close proximity to the exterior surfaces of the sides of the inner tubular member 50.

In the illustrated embodiment moreover, each recuperator unit comprises two rows of such heat exchange elements 23, corresponding heat exchange elements in the rows being disposed in aligned relation. Such recuperator unit is mounted at the top of the recuperator chamber 1 with its rows of heat exchange elements projecting downwardly into chamber 10 and extending across the chamber and transversely of the direction of the stream of flue gases, and with the major axis of cross section of the rectangular heat exchange elements extending in the direction of flow of the flue gases.

In each recuperator unit of the recuperator shown in FIGURES 1 and 2, each heat exchange element in the first row facing the stream of hot flue gases is provided with a shielding member 66. On each such heat exchange element the shielding member is located adjacent the portion of the wall of the outer tubular element which faces the stream of hot flue gases.

Such shielding preferably is formed of a suitable heat resistant material, such as a heat resistant metal alloy or metal covered with a layer of heat resistant material, or it may be entirely formed of a heat resistant non-metallic material such as ceramic material. According to the present invention the shielding member is supported adjacent such portion of the wall of the outer tubular element of heat exchange element by means permitting relative movement between the shielding member and the outer tubular element of the heat exchange element so that the shielding member and the tubular member with which it is associated can independently undergo dimensional changes in response to temperature changes.

In the embodiment of the invention illustrated by FIGURES 4 to 7, inclusive, the shielding member is formed of a heat resistant metal and not only protects the adjacent portion of the outer wall of the heat exchange element with which it is associated, but also is shaped and supported so as to divert hot gases of the stream into the spaces between adjacent heat exchange elements, thus facilitating heat transfer. The shielding member 66 is fixed to a suitable bracket 67 which is fastened to the surface of the outer tubular element of the heat exchange element approximately equally distant from the ends of the downwardly extending portion of the outer tubular element exposed to the flue gases. As shown in FIGURE 5, such bracket may take the form of a shaped sheet metal member of generally U-shaped configuration comprising legs 68 having at their ends flanges 69 welded to the front end surface of outer tubular element 51 of the heat exchange element and joined by a transverse member 70 to which the shielding member 66 is welded.

Near the upper and lower ends of the exposed portion of the outer tubular element of the heat exchange element 23, at points spaced from the bracket 67, the shielding member is also supported by brackets 72 so that it is in spaced relation to but is capable of movement longitudinally of the outer tubular member. Each bracket 72 may take the form of that illustrated in FIGURE 7, which is shaped of sheet metal and has two legs 73 the ends of which carry flanges 74 which are welded to the front end of the outer tubular element 51. The bracket also has a transverse portion 75 which extends for part of the height of the legs and bears against the rear of shielding member 66, and with transverse outwardly projecting end portions 76 each of which has a curved end 77 extending around the front edge of shielding member 66. The bracket thus prevents lateral movement while permitting sliding longitudinal movement of the shielding member 66.

Since the shielding member 66 is preferably formed of a heat resistant material such as a heat resistant alloy, it has a coefficient of expansion substantially different, and for this reason expands and contracts to an extent different, than that of the metal of which the outer tubular element 51 is formed. However, even if the coefficients of expansion should be identical, the shielding member 66 will nevertheless expand or contract differently than the outer tubular element since it will be heated to a different temperature due to its greater exposure to hot flue gases. The means described above for supporting the shielding member 66 permits the shielding member 66 to expand and contract freely and independently of the outer tubular element 51 of the heat exchange element, since the ends of member 66 are slidably supported so that they can move longitudinally relatively to the tubular member as indicated above. Moreover, since the fixed bracket 67 is fastened to the shielding member substantially at its center, the dimensional changes and resulting longitudinal movements of portions of the shielding member 66 relative to adjacent portions of outer tubular element 51, are substantially equalized in both directions from the fixed bracket 67.

In the embodiment of FIGURES 8, 9 and 10, inclusive the heat exchange element is similar to the element 23 previously described in that it comprises an inner tubular element 50 of rectangular cross section surrounded by a spaced elongated outer tubular element 51 of rectangular cross section having fin portions 63 and 64. In this case however, the elongated shielding member 80, which is positioned adjacent the front end surface of element 51 facing the stream of hot flue gases, is wholly formed of non-metallic heat resistant material, such as ceramic material. This shielding member 80 also may be shaped and supported to divert flue gases between adjacent heat exchange elements. It is immovably supported in spaced relation to the outer tubular element 51 by bracket 81 at the lower end of element 51, and is slidably supported in such spaced relation by bracket 82 located near the upper end of the element 51. The upper supporting bracket 82 illustrated in FIGURES 8 and 9 is similar to that shown and described in connection with FIGURES 6 and 7, except for the changes in shape necessary to accommodate the thicker shielding member 80; this bracket permits slidable movement of shielding member 80 longitudinally of the heat exchange element, while constraining it against lateral movement.

The bracket 81 used at the bottom of the heat exchange element is shown in FIGURES 8, 10 and 11; it comprises a generally U-shaped member 83 having supporting legs 84 terminating in flanges 85 welded to the outer tubular element 51 and having a transverse portion 86 bearing against the rear surface of the shielding member 80. Fixed to the bottom of said member 83, as by welding, is a plate member 87 having an upturned front edge 88 bearing against the front portion of the shielding member 80 and upturned side edges 89 constraining the shielding member 80 against lateral movement.

Thus, although there will be substantial differences in the amounts that the lengths of the tubular element 51 and the shielding means 80 change due to temperature, such differences are compensated for since all portions of shielding member 80 are capable of longitudinal movement relative to tubular element 51 because of the slidable support provided by bracket 81.

Another embodiment of the invention is illustrated in FIGURES 12 to 14, inclusive. In this case the heat exchange element 90 is of circular cross section, comprising an outer tubular element 91 and an inner tubular element 92 the annular space between which preferably has heat exchange fins 93, shown in the illustrated embodiment as being welded to the inside surface of the outer tubular element and extending into close proximity to the outer surface of the inner tubular element.

Such circular heat exchange elements 90 are adapted to be employed in place of rectangular heat exchange elements 23 in a recuperator unit similar to that described above in connection with FIGURE 3 and in a recuperator similar to that described above in connection with FIGURES 1 and 2. Certain of such circular heat exchange elements 90, located in the exposed positions previously described, are provided with spaced shielding members to shield the portion of the front wall of the outer tubular element 91 directly exposed to and facing the stream of hot gases. In FIGURES 12 to 14, inclusive, an elongated shielding member 94, formed of heat resistant metal, is shown as supported adjacent such portion of the outer surface of a tubular element 91 of such a heat exchange element, by a fixed bracket 95 at the upper end of the heat exchange element and by another bracket 96 at the lower end which restrains the shielding member against lateral movement but permits it to move longitudinally. Thus even though the shielding member 91 develops dimensional changes due to temperature which are different from those of the tubular member 91 the bracket 96 provides slidable support for member 91 which allows compensation for these differences.

In this embodiment the fixed bracket 95 which is shown in FIGURE 13 is similar to the fixed bracket previously described in connection with FIGURE 5; it comprises two legs 97 formed with flanges which are welded to the outer tubular element 91 and a curved transverse portion 98 connecting the legs and contacting the rear surface of the shielding member, which is welded to the portion 98.

The other bracket 96, as shown in FIGURE 14, is of unitary construction and comprises two spaced legs 99 terminating at their inner ends in flanges 100 welded to member 91; the outer ends of the legs are connected to laterally projecting return bend portions 101 joined by a transverse portion 102 extending around the front side of the shielding member 94. The return bend portions 101 thus form grooves or channels receiving and guiding the edges of shielding member 94 for longitudinal movement only.

In the embodiment of the invention shown in FIGURES 15 to 17, inclusive, the heat exchange element 90 is similar to the heat exchange element of the embodiment described in FIGURES 12 to 14, inclusive, in that it comprises an elongated outer tubular element 91 of circular cross section surrounding an elongated inner tubular element 92 also of circular cross section. The outer tubular element 91 also carries internal heat transfer fins 93 which extend through the peripheral space between the outer and inner tubular elements 91 and 92. The heat exchange elements of this embodiment may be employed in recuperators and recuperator units of FIGURES 1 to 3, inclusive, in place of the heat exchange elements 23 of the embodiments of FIGURES 4 to 7 and 8 to 10.

In the embodiment of FIGURES 15 to 17 the shielding member 103, which protects the portion of the surface of the outer tubular element which faces the stream of hot gases, is formed of heat resistant metal and is supported in spaced relation adjacent such surface portion by means of brackets 104. Each of these brackets is of T-shaped cross section and comprises a portion 105 defining the leg of the T which projects laterally from and extends longitudinally of the protected surface of the outer tubular element 91, being preferably welded to it by means of lugs 106. The outer end of projecting portion 105 has fixed to it transversely extending portion 107, defining the top of the T. The shielding member 103 embodies a channel or groove 108 which closely but slidably fits around each bracket 104 to permit longitudinal but substantially no transverse movement of shielding member 103 relatively to outer tubular element 91 of heat exchange element 90. The channel 108 shown is formed in a sheet metal guide member 109 fixed as by welding to the reverse side of the shielding member 103, although it could be formed directly in the member 103 if it was of sufficient thickness. In this embodiment six such brackets 104 are shown, although either more or less could be used; the number used preferably is that which will prevent appreciable distortion of the shielding member 103 under the influence of heat, even though it is formed of heat resistant metal which is of light gage to reduce cost. Preferably, the brackets 104 and guide member 109 are also made of heat resistant metal.

In this embodiment, the shielding member 103 is supported at a fixed point relative to tubular element 91 by a supporting member 111 fixed, as by welding, to the lower end of outer tubular member 91; the bottom end of the shielding member rests on support 111. In this case, as in the embodiment of FIGURES 8 to 10, inclusive, the dimensional changes and resulting longitudinal movement of all portions of shielding member 103 relatively to adjacent portions of tubular element 91 occur in increasing degree upwardly from the support 111. Of course the point of fixed support of the shield 103 can be made elsewhere such as at the central or at the upper portion of the shield.

In this embodiment, the supporting members are completely shielded from the stream of hot gases, which increases their durability and makes possible the use of less heat resistant, and hence less expensive, metal than that of the shielding member. Moreover, it is a simple matter to remove the shielding member 103 for inspection, cleaning or repair by removing the member 111 and sliding the shielding member off the brackets 104 in the direction of the free or unobstructed end of the tubular element 90.

In the embodiment of FIGURES 18 to 20, inclusive, the heat exchange element 23 is in all respects similar to the element 23 of the embodiment of FIGURES 4 to 7, inclusive, and may be used in the same manner in recuperator units and recuperators; the heat exchange element 23 comprises inner and outer tubular elements 50 and 51 of rectangular cross section, defining between them a peripheral space 52 through which extend fins 63 and 64 fixed to the inner surface of the outer tubular element.

In this embodiment, however, the shielding member 114 comprises a plurality of segments 115 and 116 each formed of heat resistant ceramic material, disposed in abutting end to end relation adjacent the portion of the surface of outer tubular element 51 which faces the stream of hot gases, which in this case is an end surface of the tubular member of rectangular cross section. Each of the segments is supported by a supporting member 117. Preferably, each of members 117 comprises a stem portion 118 which projects laterally from the tubular member 51 and is rigidly fixed to it, as by a lug portion 119 welded to the surface of tubular element 51; each member 117 also includes a transversely extending flange or head portion 120 of flat circular configuration, which is rigidly fixed to projecting stem portion 118.

Each of segments 115, other than lowermost segment 116, includes a slot 122 extending longitudinally through it from end to end, terminating in flat end surfaces 123 of the segment normal to the slot; as is shown in FIGURE 19, the slot is preferably T-shaped in cross section to closely fit around the stem and head portions 118 and 120 of the associated supporting member 117. Preferably, each supporting member 117 associated with a segment 115 is located at approximately the center of the length of the segment when it is normally in place in the shielding member 114.

The lowermost segment 116 is similar in configuration to the segments 115 except that its slot 124 extends only a portion of the length of segment 116; the slot 124 also is of T-shaped cross section to fit closely the cross section of the associated lowermost supporting member 117. Since in segment 116 the slot 124 does not extend through the top flat end surface 123 normal to the slot, the lowermost supporting member 117 thus supports the segment 116 at a fixed position relative to the tubular element 51, and segment 116 provides vertical or longitudinal support for the segments 115. The flat abutting end surfaces 123 of segments 115 and 116, in conjunction with the slots 122 and 124 engaging supporting members 116, prevent any appreciable transverse movement of the segments, while permitting longitudinal movement in response to length changes caused by temperature changes.

In this embodiment, moreover, the cross sectional shape of the segments 115 and 116 is such that the front side 125 of each segment is shaped to divert the hot gas in the stream of flue gas into the spaces between the heat exchange elements 23 in the recuperator, while the rear side 126 is so shaped as to closely approach the portion of the surface of the tubular element 51 which is shielded. When the rear side is so shaped, the hot gases of the stream are substantially prevented from contacting such portion of the tubular element or the supporting members 117, thereby preventing deterioration of such parts and permitting the use in these parts of materials which have a lower degree of heat resistance, and hence cost less, than would otherwise be possible.

The segmented construction of the shielding member 114 facilitates installation or removal of the shield, as for inspection, repair or replacement, even without removal of the heat exchange elements from the recuperator installation. As shown in FIGURE 20, the uppermost segment 115 may be manually moved vertically until its lower end clears the top end of the next lower segment after which it may be tilted as shown in broken lines to permit it to be slid off its supporting member 117 and removed; the next lower segment can be similarly removed, and so on, until all have been taken off. In installing the shield, the reverse procedure is used, beginning with the lowermost segment 116 and installing each upper segment 115 by tilting it and sliding it on its support 117 to the proper position.

The present invention thus provides recuperator units and recuperators in which at least the heat exchange elements most directly exposed to the stream of hot flue gases are provided with shielding members which protect the front wall portions of the outer tubular elements facing the hot gas stream from harmful effects such as those previously indicated. In each such shielded heat exchanger, the shielding member greatly reduces or prevents erosion, corrosion, or other harmful chemical or metallurgical reactions involving the metal of the front wall portion of the tubular element facing the gas stream. It prevents depositing of materials which could harm or impair the heat exchange properties of such front wall portion. It prevents localized overheating or unequal heating of this front wall portion which causes distortions of the types described previously.

The shielding members need to be applied only over limited areas of those relatively few heat exchange elements in a recuperator which ordinarily deteriorate the most due to the greatest direct exposure to the hot gas stream; therefore the shielding members can be made of materials having the most effective heat resistant properties for the use, since material costs and expansion coefficients are relatively unimportant. Even though the materials themselves may be quite expensive, such relatively small amounts are used that the overall cost of a recuperator embodying the invention need not be substantially increased; in fact, it may be reduced since the substantial amounts of expensive heat resistant alloys often used in the heat exchange elements themselves can be reduced or eliminated.

Moreover, the slidable mounting of one or more portions of the shielding member, permitting them to move longitudinally relatively to the heat exchanger tubular element, permits the shielding member and tubular member to independently adjust dimensionally in response to temperature changes. Therefore, any material which is otherwise best suited to perform the desired shielding and protective functions can be used in the shielding member, without restrictions imposed by the necessity of relating its coefficient of expansion to that of the metal of which the tubular element of the heat exchange is formed. Furthermore, such relative longitudinal movement between the shielding member and the tubular element carrying it prevents any possibility that the shielding member itself could introduce distortions into the heat exchange elements due to differences in amounts of dimensional changes due to temperature changes.

For these reasons, the shielding members mounted as described above increase the service lives of heat exchange elements, and recuperator units, and recuperators embodying them and reduce furnace shut-downs for inspection or repair; for the same reasons, they make possible the use of higher temperatures of the hot flue gases and of the air or other gas which is heated, with consequent increases in furnace efficiencies. This factor is exceptionally important in increasing the output of existing furnaces.

While the invention has been described in connection with bayonet type heat exchange elements of rectangular and circular cross sections having heat exchange fins in the peripheral space between the inner and outer tubular elements, it may be employed in connection with recuperator heat exchange elements without fins, and of different cross sections. The use of such fins in recuperator heat exchange elements is described and claimed in my copending applications Serial No. 7,440 filed February 8, 1960, and Serial No. 7,441 filed February 8, 1960.

My invention also contemplates the use of shielding

I claim:

1. A heat exchange recuperator comprising a generally horizontally disposed longitudinally extending chamber; means for passing a stream of heating gases longitudinally through said chamber; a structure for conducting gases to be heated extending across the top of said chamber and comprising upper and lower compartments extending transversely of said chamber with a lower partition at the bottom of said lower compartment and an intermediate partition separating the upper and lower compartments; a bank of downwardly extending heat exchange elements suspended from such structure, each of said heat exchange elements comprising a downwardly extending elongated inner tubular element having an opening at its lower end and at its upper end being supported by said intermediate partition in communication with said upper compartment, and a downwardly extending elongated outer tubular element of heat conductive metal surrounding said inner tubular element and defining therewith a peripheral space, said outer tubular element having a closed lower end and at its upper end being supported by said lower partition in communication with said lower compartment and having its exterior surface of metal and substantially bare of external protuberances providing extended heat transfer surfaces; and means for protecting against the blast of the gas stream at least the heat exchange elements in said bank first exposed to said stream of heating gases, said means comprising elongated shielding means positioned adjacent the outer tubular element of each such heat exchange element, said elongated shielding means being formed of heat resistant material having a coefficient of thermal expansion different from the metal of said outer tubular element, said elongated shielding means extending substantially throughout the length of only that portion of the surface of said outer tubular element facing the stream of heating gases and being at all points thereof spaced a substantial distance from said surface, and means carried by said outer tubular element for supporting said elongated shielding means in such spaced relation, said means supporting said elongated shielding means in stationary relation to said outer tubular element at only one location of said shielding means and tubular element and providing for essentially only longitudinal relative movement between all other portions of said shielding means and said outer tubular element.

2. A heat exchange recuperator comprising a generally horizontally disposed longitudinally extending chamber, means for passing a stream of heating gases longitudinally through said chamber; a structure for conducting gases to be heated extending across the top of said chamber and comprising upper and lower compartments extending transversely of said chamber with a lower partition at the bottom of said lower compartment and an intermediate partition separating the upper and lower compartments; a bank of downwardly extending heat exchange elements suspended from said structure, each of said heat exchange elements comprising a downwardly extending elongated inner tubular element having an opening at its lower end and at its upper end being supported by said intermediate partition in communication with said upper compartment, and a downwardly extending elongated outer tubular element of heat conductive metal surrounding said inner tubular element and defining therebetween a peripheral space, said outer tubular element having a closed lower end and at its upper end being supported by said lower partition in communication with said lower compartment and having its exterior surface of metal and substantially bare of external protuberances providing extended heat transfer surfaces; and means for protecting against the blast of the gas stream at least the heat exchange elements in said bank first exposed to said stream of heating gases, said means comprising a plurality of segments formed of heat resistant material having a coefficient of thermal expansion different from the metal of said outer tubular element, said segments being disposed in superposed end to end abutting relation to form an elongated shielding means extending substantially throughout the length of only that portion of the surface of said outer tubular element facing the stream of heating gases, each of said segments being at all points spaced a substantial distance from the adjacent surface of said outer tubular element and each of said segments except the lowermost having extending from end to end thereof a generally T-shaped slot which when said segment is in its operative position adjacent said outer tubular element is located generally vertically and opens generally centrally of the surface of said segment facing said outer tubular element, a supporting member for each of said segments except the lowermost fixed to the outer surface of said outer tubular element and having a stem portion the maximum cross sectional dimension of which is less than the minimum cross sectional dimension of said T-shaped slot in said segment and a head portion which engages the wider portion of said T-shaped slot in said segment and locates said segment against all movement except movement longitudinally of the heat exchange element when said segment is in operating position adjacent said outer tubular element, and means for supporting said lower segment against movement longitudinally toward the lower end of said heat exchange element to permit said segment to support the remaining segments thereon, the supporting means for all segments being completely shielded from said stream of hot gases, and the slotted segments being readily removable from the heat exchange element by being moved vertically and tilted relatively to the heat exchange element.

References Cited in the file of this patent

UNITED STATES PATENTS

| | | |
|---|---|---|
| 486,990 | Tallmage | Nov. 29, 1892 |
| 1,894,270 | Grady | Jan. 17, 1933 |
| 1,919,203 | Coutant | July 25, 1933 |
| 2,841,383 | Hazen | July 1, 1958 |

FOREIGN PATENTS

| | | |
|---|---|---|
| 928,633 | France | June 9, 1947 |